Sept. 14, 1965  P. DEFFRENNE  3,205,783
METHOD AND MEANS FOR ENSURING THE SHIFTING WITH REFERENCE
TO A STATIONARY BODY OF A MOVABLE BODY SUBJECTED TO
A VARIABLE EXTERNAL FORCE
Filed Feb. 9, 1965
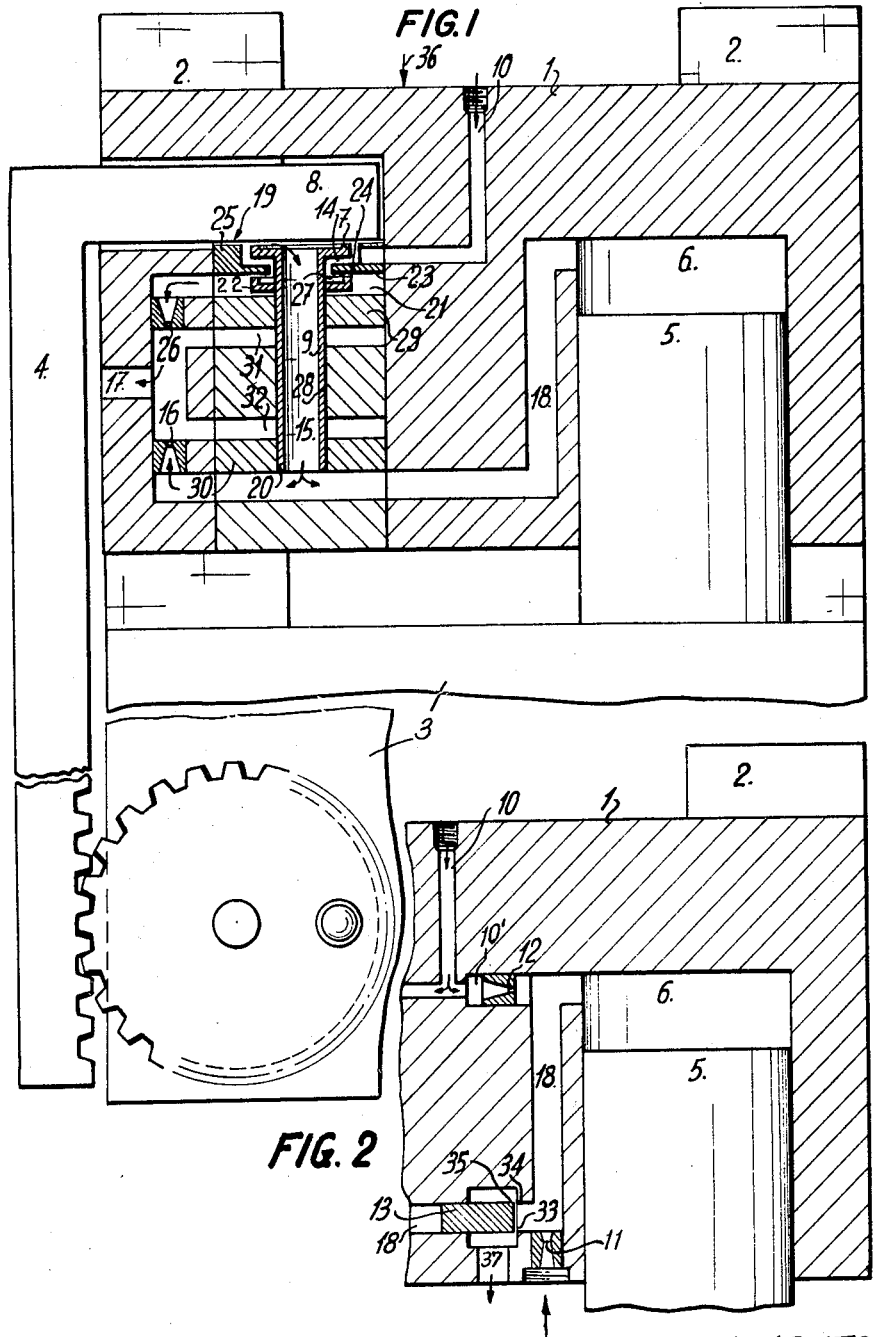
INVENTOR
PAUL DEFFRENNE

United States Patent Office 3,205,783
Patented Sept. 14, 1965

3,205,783
METHOD AND MEANS FOR ENSURING THE SHIFTING WITH REFERENCE TO A STATIONARY BODY OF A MOVABLE BODY SUBJECTED TO A VARIABLE EXTERNAL FORCE
Paul Deffrenne, Geneva, Switzerland, assignor to Mecanorga S.A., Geneva, Switzerland, a corporation of Switzerland
Filed Feb. 9, 1965, Ser. No. 433,839
Claims priority, application Switzerland, Oct. 3, 1960, 11,105/60
5 Claims. (Cl. 91—52)

This is a continuation-in-part of my application Serial Number 140,557, filed September 25, 1961, now abandoned.

The steadily increasing accuracy requirement in the operation of modern machines necessitates that manufacturers give particularly vigilant care to the irregularities which may arise by the stress in control systems, more particularly towards the end of an operation. The existence of such stress depends on a number of parameters such as the friction between surfaces moving with reference to each other, the speed of movement, the efforts to be overcome, the mechanical resistance of the control members and the like. Stress variation is therefore one of the chief causes of errors found in machining. In spite of the care which may be taken in practice, the consequence of the care is merely to slow down the rhythm of production, and this time drawback is extremely objectionable.

The present invention has for its object to ensure the placement, with reference to a stationary body, of a movable body subjected to a variable external force, said movement being obtained by a control mechanism. According to the invention, a permanent adjustment in at least one area is exerted on the distance between the end of a control mechanism and a correcting member. The position of the correcting member with reference to the end of the control mechanism, adjusts the intensity of a variable opposing force exerted by a fluid lying between the stationary body and the movable body and adapted to overcome the component of the external effort within the corresponding area. On the other hand, said correcting member is itself subjected automatically to a relative compensating displacement with reference to the movable body and, consequently the correcting member moves towards or away from the wall of the movable body (which body is subjected to the action of the end of the control mechanism) by an amount equal to that of the movement of the end of the control mechanism towards or away from said correcting member. This results, on the one hand, in the maintenance of the movable body in, or its return into, its starting position of equilibrium with reference to the end of the control mechanism. On the other hand, there is exerted on said control mechanism end, only a very small initiating outside effort and this initiating effort is variable only between narrow limits, while the variable opposing force is of a much greater magnitude and is applied directly to the stationary body. Thus, the stressing existing in the control mechanism is substantially negligible in magnitude, and its modifications do not risk affecting the proper operation of the machine. As the effort exerted on the end of the control mechanism is very small, the auxiliary control system of this design which controls much larger opposing forces makes possible a considerable reduction in the bulk of the different parts.

The invention has also for its object the provision of one preferred structural arrangement for carrying out the above, including a control mechanism carried by the stationary body, at least one chamber being provided between the adjacent walls of the stationary and movable bodies, which chamber is fed with a fluid under pressure, fed from a supply controlled by the control mechanism. According to the invention, there are provided means for controlling the spacing between the end of the control mechanism and the correcting member, by which, on the one hand, the spacing of the correcting member with reference to the end of the control mechanism, adjusts the intensity of the variable opposing force exerted by the fluid inside the chamber, and this variable opposing force is directed to overcome the parallel component of the outer force, while, on the other hand, the correcting member is automatically subjected, with reference to the movable body, to a reverse compensating movement, whereby the correcting member is moved towards or away from the wall of the movable body, which movable body is subjected by motion of the end of the control mechanism to a movement of an amount equal to that by which the end of the control mechanism moves towards or away from said correction member. This arrangement is designed in a manner such that with the control member now held stationary, the movable body is held in, or returned into, its starting position of equilibrium. At this position there is an equilibrium of forces on the correcting member with reference to the end of the control mechanism, and hence no further movement of the correcting member with respect to the now stationarily held control mechanism. Furthermore, with the exertion of a very small effort on said end of the control mechanism, there will be a larger opposing force generated within a cylinder having one end in the stationary body and the opposing end in the movable body, and such opposing force is adapted to overcome the external force which acts directly on the movable body.

I have illustrated, diagrammatically and by way of example, in the accompanying drawings, an embodiment of the arrangement according to the invention. In said drawings:

FIG. 1 is a diagrammatic illustration of said embodiment and

FIG. 2 shows a modification thereof.

Turning to FIG. 1, the movable member 1 which is formed, for instance, by the carriage of a machine-tool, may move over the slideways 2 rigid with the stationary body 3, which latter, in the particular case considered, is constituted by the frame of the machine. The initial rough movement of the movable body is controlled by the control mechanism 4, actuated either by hand or automatically. FIGURE 2 shows a handle bearing circular gear mounted on a portion of body 3 and intermeshed with 4.

In the example described, original rough upward adjusting of the movable body 1 is accomplished by physical contact between an end 8 of control mechanism 4 and the movable body 1. During this upward movement pressure fluid from an outside source, and entering passage 10, will escape around end 8. To decrease this escape, end 8 may be manually moved downwardly very slightly until the escape ceases, or the operator may simply wait a few moments and the normal functioning of an auxiliary control system, to be described later, will raise the movable member 1 with respect to end 8 to reduce the clearance between the lower side of 8 and the adjacent upper portion of a side opening in 1, thus also reducing the escape of pressure fluid to a minimum and thenceforth allowing the normal operation of the auxiliary control.

In the embodiment described after the manual adjustment, shifting of the movable body 1 is accomplished without excessive escape of pressure fluid by a piston 5 sliding inside a cylinder 6, the latter being fed with compressible fluid by the auxiliary control system to be described hereinafter.

This auxiliary system, in turn, is controlled by the position of the control mechanism 4. A piston 5 is illustrated as rigid with the stationary body 3, while the cylinder 6 forms part of the movable body 1, but, obviously, the reverse arrangement is also possible.

The downward return movement of the movable body 1 towards its correct starting position with a force 36 exerted thereon, may be controlled directly by the hand control mechanism 4, but nothing prevents, of course, the use of a further auxiliary control mechanism for ensuring said return movement.

The auxiliary control system which is adapted to adjust the fluid pressure inside the cylinder 6, with a view to overcoming the external effort 36 and to ensuring the final and exact shifting of the movable body 1, includes a control system provided with a feeler head 7, mounted integral with a slideable correcting member 9, the head being designed to permanently maintain a distance between itself and the end 8 of the control mechanism 4. The correcting member 9 is slidably carried within the movable body 1, and it has a dual function to wit: that of adjusting, (as a function of its position with reference to the end 8 of the control mechanism 4), the pressure of fluid inside the cylinder 6 and, on the other hand, to be subjected to a relative compensating movement with reference to the movable body 1, whereby the feeler head 7 and the integral correcting member 9 are caused to move towards or away from the surface of the movable body 1 (such as the top surface of ring 25) extending in immediate proximity with the end 8 of the control mechanism 4.

The fluid under pressure is fed through a channel 10 into a recess or chamber 14 formed in the movable member 1, around the feeler head 7 of the correcting member 9. The principle underlying this invention consists in the flow of a compressed fluid of the same nature as that which feeds the cylinder 6 between two ports. The first of said ports is of a variable cross-section, and is constituted by the clearance appearing between the end 8 of control mechanism 4 and the outer surface of the feeler head 7, together with the chamber 14 surrounding said feeler head 7. The fluid under pressure is fed through the channel 10 to chamber 14 and then to an intermediate chamber 15 through the slight space between the feeler head 7 and end 8 of control mechanism 4. The second port is of unvarying cross-section and is constituted by the outlet port 16 located between said intermediate chamber 15 and a channel 17 opening outwardly. In the embodiment described, the cylinder 6 communicates directly with the intermediate chamber 15 through the channel 18.

The principle of control by flow of fluid, as set forth above, is well known and is in use in a number of applications, as for example, in the self adjusting fluid bearing in U.S. Patent 3,100,130 of August 6, 1963.

Applying this principle to the instant embodiment, however, may be rendered more clear by considering the following explanation.

If we call:

$P_0$ the pressure of the feed fluid,
P the pressure of the of the fluid between the two orifices, i.e. in space 15 and channel 18 and chamber 6,
$p_r$ the perimeter of the scanning head 7, and
d the linear distance or play existing between the end 8 and the perimeter of the scanning head 7, we can write that the fluid flow through the upper orifice is equal to the product of the annular discharge area above the annular orifice (which is $p_r$ times d) multiplied by the speed of flow of the fluid through this annular orifice. This latter speed is a function of both $P_0$ and P. This latter speed may be written $f(P_0,P)$.

Thus the flow past the feeler head equals $P_r$ times d times $f(P_0 P)$.

Likewise if we call s the discharge area in the second orifice 16 and note that the speed of flow therethrough is another function of P, or $f'(P)$, we can write that the fluid flow through 16 is equal the area times the speed or S times $f'(P)$.

Therefore replacing "times" by $\times$ we can write $$p_r \times d \times f(P_0,P) \text{ equals } s \times f'(P)$$

In this equation as "$p_r$," "$P_0$" and "s" are design constants, the only two variables are "d," the play between 8 and scanning head 7, and P the pressure between the two orifices and the pressure in cylinder 6. We can therefore say that to each value of distance d there corresponds a given value of the pressure P.

The location of the correcting member 9 with reference to the end 8 of the control member 4 is thus controlled permanently by the above-described arrangement and, by reason of the mechanism referred to, the fluid pressure inside the cylinder 6 is constantly defined by the distance between the end 8 and the head 7 of correcting member 9. However, while the correcting member 9 performs this function, it is also subjected simultaneously to a relative compensating movement with reference to the movable body 1, whereby it moves nearer to or away from the plane of wall 19 of the movable body 1, by an amount equal to that by which it moves nearer to or away from the plane of the nearest face of end 8.

To this end, the correcting member 9 forms a sort of slide valve which has a tendency to move away from the end 8 under the action of the fluid pressure prevailing inside the intermediate chamber, chamber 15, and exerted on an annular surface equal to the difference between the area of a larger circle having a diameter equal to the outer rim of the feeler head 7, and the area of a smaller circle having a diameter equal to the outer rim of the tail end 20 of the correcting member 9; while a thrust is also exerted on member 9 in the opposite direction by the pressure prevailing in a further auxilary chamber 21, said thrust being applied to the surface of a shoulder 22 formed on the correcting member 9.

The structure is such that the larger diameter of said shoulder 22 is equal to the diameter of the feeler head 7 while its smaller diameter is equal to that of the tail end 20 of the correcting member 9. The operative area of the shoulder 22 is thus equal to the difference between the areas of the feeler head 7 and of the tail end 20 of the correcting member 9 and, consequently, the fluid pressures are exerted in opposite directions on equivalent areas.

On the other hand, the pressure inside the auxiliary chamber 21 is adjusted by a flow of fluid between two ports, of which the first, of a variable cross-section, ensures a connection between said chamber 21 and the supply of pressure from 10 through a passageway formed between a flat surface 23 parallel with the flat surface of the end 8 and the surface 24 of the shoulder 22. Said surface 23 is formed on a ring 25 rigid with the movable member 1. The other, or second, port is 26, of unvarying cross-section, and having a discharge area which is equal to that of the port 16. The second port 26 serves for the flow of fluid between the auxiliary chamber 21 and the channel 17 opening outwardly. The flow of fluid between the latter two orifices (namely the variable orifice between 23 and 24, and the fixed orifice 26), follows the same law as that disclosed above for the first control circuit. Under such conditions, the pressure of fluid is the same in both chambers 15 and 21 when the distance separating the shoulder 22 on the correcting member 9 and the surface 23 of the ring 25 rigid with the movable body 1, is the same as the distance between the feeler head 7 of the correcting member 9 and said end 8.

The magnitude of the feed pressure which is exerted on the two opposite sides of the groove 27 formed between the head 7 and the shoulder 22 does not change the mode of action. If desired, the correcting member, and particularly the shoulder structure 22, may be constituted by a plurality of assembled parts.

Structurally the distance between the upper surface 24 of the shoulder 22, which faces the ring 25, and the upper surface of the feeler head 7, is equal to the spacing between the lower surface 23 of the ring 25 and the lower surface of the end 8 of the control mechanism 4, when the latter mechanism is in its position of equilibrium with reference to the movable body 1.

Under such equilibrium conditions, in order that the correcting member 9 may maintain its position of equilibrium, it is necessary that the opposite stresses acting on it shall be equal, and to this end, and by reason of the equality in the areas on which said pressures are exerted, the fluid pressures should be the same in the chambers 15 and 21. Now, in the two parallel circuits through which the fluid flows (namely 10-9-16 and 10-21-26), the input pressure (from 10) and the cross-section of the output ports (16 and 26) are the same. Equality between the pressures is therefore obtained whenever the input ports have equal cross-sectional areas, that is when the distance between the cooperating surfaces 23 and 24 is the same as that between the top of the feeler head 7 and the adjacent lower surface of the end 8. This implies that the movable body 1 is subjected, by the opposing force 36 to a movement equal to and in an opposite direction from the movement of the correcting member 9.

Lastly, the correcting member 9 is guided by a bearing 28 for which lubrication may be provided. The compressed fluid fed from the chambers 15 and 21 and adapted to ooze through the very reduced clearance between the correcting member 9 and the rings 29 and 30, is exhausted into the chambers 31 and 32 communicating outwardly through the channel 17.

The purpose of the device is to maintain the distance between the control member 8 and the movable body 1 substantially constant, that is, within a precision range varying less than a fraction of a micron. This is made possible because the normal working spacing, for long timed periods, between end 8 of the control mechanism and the ring 25 (the latter 25 being integral with body 1), is very small as for example of the order of one or two hundredths of a millimeter. On the other hand, the radial width of the ring 25 is several hundreds of times this spacing, namely at least 5 millimeters.

Under long timed working periods, the escape of fluid under pressure between members 8 and 25 is practically negligible, and this small fluid escape has no appreciable effect on the pressure in conduit 10.

The forward adjusting movement of the carriage or movable body 1 is relatively slow and of a short time duration. Thus end 8 of the control member 4 may be moved upwards in FIG. 1 for an original adjustment and then moved slightly downwards until the above related normal working clearance between 8 and 25 is obtained at which time the noticeable fluid blow out past 25 subsides. Alternately the end 8 need not be moved down after its upward movement, but the operator can merely wait a short period until the adjusting fluid blow out subsides, after which short time period the longer normal working conditions are in existence.

After the adjusting conditions are finished the various elements described can react in moments, to assume the lesser normal clearances, and therefore assure more steady functioning for the longer working periods. Therefore there is no danger of a continuing time interval after original setting of 8, wherein the spacing between 8 and 25 is of a value large enough to disrupt the longer time period of normal working and functioning of the device.

In its simplest embodiment illustrated in FIG. 1, the cylinder 6 receives the fluid under pressure from the chamber 15, and through the channel 18 connecting said chamber 15 with the cylinder 6.

It may occur, however, that in certain cases it is necessary to amplify the output of fluid adapted to ensure the movement of the movable body 1 with reference to that of the control system. In such a case, the arrangement may be modified as shown in FIG. 2, wherein the omitted left side of FIG. 2 is identical with the complete left side of FIG. 1. In this modification the pressure of a thrust-exerting fluid is defined by a flow from two inlet ports 11 and 12, to an outlet port 33, the cross-sectional area of the added ports 11 and 33 each being larger than the cross-sectional areas required in the first modification wherein a single fluid is used. The input port is, for instance, formed by an opening of an unvarying cross-section 12, which taps off a predetermined fluid output 10′ from the feed channel 10 to enter the cylinder 6 after being reinforced by amplifying fluid admitted through a second non-varying inlet 12. The cross-section of the output port 33 is of a variable size, and depends on the movement of the adjusting edges 34 and 35 of a slide valve 13 inserted in the channel 18.

Such a modified structure allows the use of a plurality of different fluids as by tapping off a flow 10′ which may pass through the port 12, and adding a second fluid feed by non-varying port 11.

The operation of the arrangement is as follows: Let us assume that the whole system is in pressure balanced equilibrium, and the external stress exerted on the movable body 1 in the direction of the arrow 36 is offset by the opposing force exerted by the compressed fluid or fluids contained in the cylinder 6. If the control mechanism 4 is now actuated in a direction such that its end 8 has a tendency to move away from the feeler head 7 of the correcting member 4, then the increase of the cross-sectional area of the passageway between the head 7 and the end 8 will first allow the pressure to increase inside the chamber 15, the channel 18 and the cylinder 6. Thus, the opposing stress exerted on the movable body 1 is increased and the latter is shifted in the same direction as the end 8 of the control mechanism 4.

A further position of equilibrium is reached if the intensity of the external stress has not changed as soon as the system constituted by the movable body 1 and the correcting member 9 will have been subjected to a shifting equal to and of the same direction as that of the end 8 of the control mechanism 4, without having varied the position of the movable member 1 with reference to the correcting member 9. Thus, the movable member 1 follows very accurately, the movements of the end 8 of the control mechanism 4.

The return movement of the movable body 1 towards its initial position may be accomplished mechanically by movement of member 8. When member 8 moves in a direction opposite to that just described and it comes near member 1, it then comes to rest against the latter (the striking taking place against ring 25 which is integral with number 1) while carrying said member 1 along with its recoil motion.

It should be stated that for all positions of equilibrium of the system, the opposing force exerted by the fluid contained in the cylinder 6, balances the external effort 36. Now, the intensity of said opposing force depends solely on the pressure of the fluid and, consequently, on the distance between the feeler head 7 and the end 8 of the control mechanism 4. This means as stated in the paragraph above containing the equations, that, to each value of the intensity of the external stress, there corresponds a definite position of the correcting member 9 with reference to the end 8 of the control mechanism 4.

Assume now that the external stress 36 varies and increases; in such a case, and under the action of such modifications, the movable body 1 will have a tendency to move away from the control end 8 of mechanism 4. At the same time, the distance between the feeler head 7 and the end 8 of the control mechanism increases. Consequently, the correcting member 9 subjected to a larger stress by the fluid contained in the chamber 15 than by that contained in the chamber 21, moves away from the surface 19. Now, as it thus moves away from the surface 19, the surfaces 23 and 24 move also apart and the pressure increases inside the chamber 21. The movement of the correcting member 9 stops when the pressure is the same in the two chambers 15 and 21, that is when the distance between the upper surface 24 of the shoulder 22 and the lower surface 23 of the ring 25, is equal to the distance between the top (FIG. 1) of the feeler head 7 and the lower surface of the end 8. This result is reached when the movable body 1, subjected to the action of an increasing opposing force, has been shifted with reference to the correcting member 9 by an amount which is equal to and has a direction opposed to that to which the latter is subjected with reference to the end 8 of the control mechanism 4.

This results in the situation that the position of the movable body 1 with reference to the end 8 of the control mechanism 4, is completely independent of the constant intensity of the external effort, and the movable body 1 is driven without overrun when the intensity of the external effort varies.

The effort applied to the end 8 of the control mechanism 4 is equal to the product of the pressure in the circuit feeding the cylinder 6 by the small surface of the feeler head 7, whereas the value of the opposing force which finally is applied to the stationary body 3 from the fluid in cylinder 6 is equal to the product of the same pressure by the larger cross-sectional area of the cylinder 6.

As the area of the feeler head 7 is very small when compared to the area of the cross-section of the cylinder 6, this results in the situation that the control mechanism has only to overcome very small efforts and may consequently be of a reduced size. Furthermore, when the intensity of the external effort varies between zero and its maximum value, the fluid pressure in the circuit feeding the cylinder 6 varies in its turn between zero and a value lower than the feed pressure. This modification in pressure which is exerted on the surface of a reduced area of the feeler head 7, leads to a very small variation in absolute value in the effort which is to be overcome by the control mechanism 4. Therefore the varying deformation of the members forming part of said mechanism under the action of the varying stresses exerted on them is practically negligible.

It is therefore obvious that when the principle underlying the present invention is made use of, no matter what may be the actual intensity of the external effort, the control mechanism drives the movable body 1 without any relative movement therebetween, the directing effort exerted on the control mechanism is very small, and the modification in the stressing of the different parts of the mechanism is negligible.

Of course, the above disclosure is given solely by way of example and the general principle underlying this improved method and the means forming the object of the present invention, may lead to embodiments very different from that which has just been described.

I claim:

1. Apparatus for maintaining a constant distance between a movable body relative to a stationary body when an outer variable force is exerted on said movable body, said apparatus comprising a control mechanism carried by said stationary body and movable relative to said movable body, one end of said control mechanism disposed within and spaced from said movable body, a source of supply of fluid under pressure, conduit means in said movable body connected with said source of supply, at least one primary chamber between adjacent walls of the two bodies and adapted to be fed with fluid under pressure from said source of supply, the fluid under pressure being controlled by movement of the end of said control mechanism, auxiliary control means including a correcting member slidably mounted in said movable body and disposed between said conduit means and said primary chamber and opposite the end of said control mechanism, said correcting member adjusting the pressure of fluid in said primary chamber and providing a compensating movement relative to said movable body whereby it moves nearer to or away from an adjacent wall of said movable body by an amount equal to that by which it moves nearer to or away from the end of said control mechanism, said auxiliary control means further including an intermediate chamber formed by the body of said correcting member, the upper end of said correcting member being of greater diameter than the body thereof and disposed adjacent the surface of the end of said control mechanism to provide an inlet port of varying cross section for passage of the fluid under pressure into said intermediate chamber, and an outlet port of fixed cross section communicating with a vent opening in said movable body.

2. Apparatus according to claim 1 wherein said correcting member is provided with a shoulder beneath its upper end, the upper surface of said shoulder cooperating with the lower surface of a hollow member rigid with said movable body, said two surfaces providing an opening of varying cross section controlling the input of fluid under pressure to a secondary chamber and a second outlet port of fixed cross section communicating with said vent opening in said movable body, whereby when the space between the upper end of said correcting member and the surface of the end of said control mechanism is equal to the space between the opposed surfaces of said shoulder and hollow member, respectively, the pressure of fluid is the same in said intermediate chamber and said secondary chamber, thereby balancing said correcting member.

3. Apparatus according to claim 2 wherein said movable body includes a passage connecting said intermediate chamber with said primary chamber whereby the fluid producing the opposing force in said last-mentioned chamber is the same as the fluid which maintains the distance between the upper end of said correcting member and the end of the control mechanism.

4. Apparatus according to claim 1 wherein the fluid entering said primary chamber is independent from the fluid acting upon said correcting member and said movable body includes valve means in said conduit means for separating the two fluids, the fluid acting upon said correcting member also acting upon said valve means to ensure equal pressure between the two fluids.

5. Apparatus according to claim 4 wherein said movable body includes an outlet orifice of varying cross section controlled by said valve means, to permit escape of the fluid in said primary chamber as necessary to maintain equality of pressure between the two fluids.

References Cited by the Examiner

UNITED STATES PATENTS 2,655,133  10/53  Palsson _____ 91—416 X

SAMUEL LEVINE, *Primary Examiner.*